W. DERWENT, Jr.
Mill Bolt.
No. 62,943.
Patented March 19, 1867.
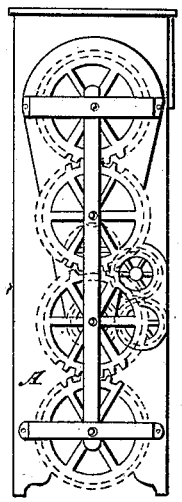
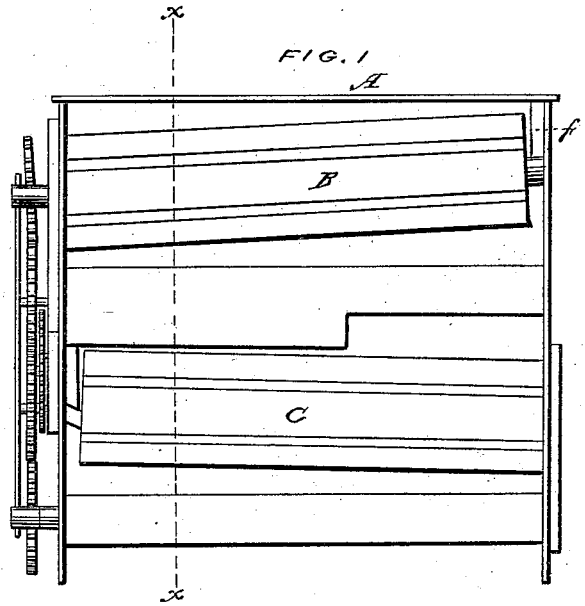
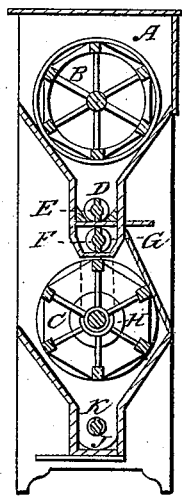
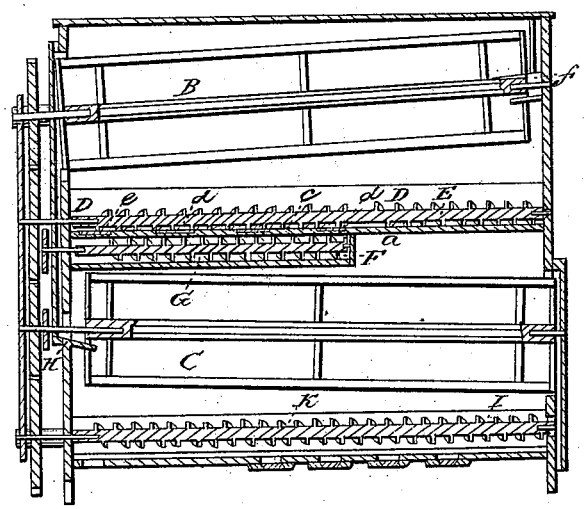
WITNESSES:
INVENTOR:

United States Patent Office.

WILLIAM DERWENT, JR., OF ROCKFORD, ILLINOIS.

*Letters Patent No. 62,943, dated March 19, 1867.*

---

IMPROVEMENT IN FLOUR BOLTS.

---

*The Schedule referred to in these Letters Patent and making part of the same.*

---

TO ALL WHOM IT MAY CONCERN:

Be it known that I, WILLIAM DERWENT, Jr., of Rockford, in the county of Winnebago, and State of Illinois, have invented a new and useful Improvement in Flour Bolts, of which the following is a full, clear, and exact description, reference being had to the accompanying drawings, which make part of this specification, and in which—

Figure 1 represents a front elevation of my improved flour bolt.

Figure 2 is a vertical central and longitudinal section through the same.

Figure 3 is a view in elevation of the outside of the chest, to which the gearing is attached; and Figure 4 is a transverse section on the line $x$ $x$, of fig. 1.

It is well known that as the bolting chest, with two bolts, is usually constructed, there is a constant return of a large portion of the coarsest particles of the ground mass from the bolt to the hopper-boy, and thence again to and through the bolt. This retards the proper action of the bolt, and injuriously affects the grade of the flour. It is the object of my invention to remedy these defects by withdrawing the middlings and coarse flour which have passed through the upper bolt, and preventing them from coming in contact with the flour again, as heretofore, and pass them directly into the lower bolt; and to this end my invention consists in interposing a short conveyer between the upper and lower bolts, or at some proper location, to pass the middlings and coarse flour which have escaped through the meshes of the upper bolt, directly to the interior of the lower bolt, to be there rebolted before being discharged back into the hopper-boy.

Within a properly secured closed chest, A, I place two bolting reels, B and C, one above the other, the reels being covered with cloths, the meshes of which vary in size; the coarser cloth being placed at the lower end of the lower reel. Between the bolts I place a partition, D, in the form of a trough, in which a conveyer, E, is rotated. This conveyer is so arranged as to carry the middlings and coarse flour which may have passed through the upper bolt towards the centre of the trough D, the bottom of which is provided with openings, having sliding gates over them in number as many as desired, and arranged in positions to draw off the contents of the trough at any point determined. Beneath the trough D is placed a second trough, F, something more than half the length of the trough D; and in this trough F I place a short conveyer, G, the blades of which carry the contents of the trough F to its outer end, and drop them through a spout, H, into the end of the bolt C. Beneath the bottom of the trough D, and near the end of the trough F, an opening, $a$, is placed, to take as much of the flour as the miller sees fit, off the upper bolt, and discharge it down a spout connecting with the opening $a$, and conduct it into the barrel or chest. Beneath the bottom of the trough D, and over the short conveyer G, one or more openings, $b$ $c$ $d$ $e$, are arranged to permit, when their slides are withdrawn, the middlings and coarse flour that pass through the upper bolt over the short conveyer, at any point desired, to pass into the trough F, and be conducted to the spout which leads to the second bolt. The journals of the bolts and conveyers run in proper bearings in opposite ends of the chest; the journals on the left-hand side of the bolt pass far enough through these bearings to carry the proper gearings, (shown in fig. 3,) to rotate the bolts and conveyers in the right direction, and at the proper relative speeds.

The operation is as follows: The bolt being put in motion, the ground mass enters the right-hand end of the upper bolt B, through a spout, $f$, and as it passes down the bolt the flour passes through the meshes of the cloth, the shorts and bran passing out at the end of the cloth. The flour which has passed into the trough D will be carried by the right-hand portion of the conveyer E to the opening $a$, and there pass to the barrel or chest, while as much as the miller desires may be rebolted after passing through the left-hand end of the upper reel; and thus through the employment of the short trough I am enabled to produce flour of a uniform grade, and with increased rapidity.

What I claim as my invention, and desire to secure by Letters Patent, is—

The short conveyer, interposed between the upper and lower bolts, substantially as and for the purpose set forth.

In testimony whereof I have hereunto subscribed my name.

WM. DERWENT, JR.

Witnesses:
WILLIAM G. PADDOCK
J. G. MANLOVE.